US012384188B1

(12) United States Patent
Chen

(10) Patent No.: US 12,384,188 B1
(45) Date of Patent: Aug. 12, 2025

(54) 3D POP-UP CARD ASSEMBLY

(71) Applicant: JAST Gifts Shenzhen Company Limited, Shenzhen (CN)

(72) Inventor: Jen-Lin Chen, Cupertino, CA (US)

(73) Assignee: JAST GIFTS SHENZHEN COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/185,177

(22) Filed: Apr. 21, 2025

Related U.S. Application Data

(63) Continuation-in-part of application No. 18/943,810, filed on Nov. 11, 2024, now Pat. No. 12,296,612, which is a continuation-in-part of application No. 17/966,903, filed on Oct. 17, 2022, now Pat. No. 12,162,302.

(30) Foreign Application Priority Data

Jul. 15, 2022 (DE) ..................... 20 2022 103 988.7

(51) Int. Cl.
*B42D 15/04* (2006.01)

(52) U.S. Cl.
CPC .................................. *B42D 15/045* (2013.01)

(58) Field of Classification Search
CPC ............................ B42D 15/045; B42D 15/022
See application file for complete search history.

(56) References Cited

U.S. PATENT DOCUMENTS

| | | | | |
|---|---|---|---|---|
| 9,873,280 | B1 * | 1/2018 | Nelson | B42D 15/042 |
| 10,500,887 | B1 | 12/2019 | Kelly | |
| 11,577,539 | B1 | 2/2023 | Chen et al. | |
| 2005/0227214 | A1 | 10/2005 | Clegg | |
| 2010/0018091 | A1 | 1/2010 | Rosendale | |
| 2011/0258893 | A1 | 10/2011 | Mayer | |
| 2016/0365010 | A1 | 12/2016 | Wise | |
| 2017/0178543 | A1 * | 6/2017 | Yeh | B44C 5/06 |
| 2017/0267012 | A1 | 9/2017 | Krieman | |
| 2018/0102070 | A1 * | 4/2018 | Yeh | G09F 1/08 |
| 2021/0005113 | A1 * | 1/2021 | Wallen | B42D 15/042 |

(Continued)

FOREIGN PATENT DOCUMENTS

DE 202021104469 12/2021

OTHER PUBLICATIONS

Communication Pursuant to Article 94(3) EPC Dated May 16, 2024 From the European Patent Office Re. Application No. 2220094.5 (4 Pages).

(Continued)

*Primary Examiner* — Gary C Hoge

(74) *Attorney, Agent, or Firm* — LaMorte & Associates PC

(57) ABSTRACT

A 3D pop-up card assembly having a base card and a pop-up construct that pops up when the base card is opened. The pop-up construct is attached to the base card using a plurality of hinge elements. Each of the hinge elements has a transition section that leads to an anchor tab. The transition section contains fold lines along which each of the hinge elements can fold. The anchor tab of each hinge element is attached to the base card. When the base card is opened, each hinge element can rotate in unaligned planes, therein applying tension to the pop-up construct as the orientation between the base card and the pop-up construct changes.

11 Claims, 6 Drawing Sheets

(56) References Cited

U.S. PATENT DOCUMENTS

| | | | | |
|---|---|---|---|---|
| 2023/0053542 | A1 | 2/2023 | Chen et al. | |
| 2024/0059093 | A1* | 2/2024 | Chen | B42D 15/022 |
| 2024/0174017 | A1* | 5/2024 | Pilachowski | B42D 15/045 |

OTHER PUBLICATIONS

Erweiterter Europaischer Pecherchenbericht [European Search Report] Dated Aug. 10, 2023 From the European Patent Office Re. Application No. 2220094.5 (6 Pages).

* cited by examiner

3D POP-UP CARD ASSEMBLY

RELATED APPLICATIONS

This application is a continuation-in-part of Ser. No. 18/943,810 filed Nov. 11, 2024, which is a continuation-in-part of U.S. patent application Ser. No. 17/966,903 filed Oct. 17, 2022, which claims priority of German Patent Application No. 20 2022 103 988.7 filed on Jul. 15, 2022. A certified copy of the foreign application has been filed in parent application Ser. No. 17/966,903.

BACKGROUND OF THE INVENTION

1. Field of the Invention

The present invention relates to 3D pop-up cards having a foldable base card with an inner side and an outer side. The base card is foldable along a fold and is reversibly transferable from a folded closed state to an unfolded open state. A pop-up construct is affixed to the inner side of the base card and the pop-up construct unfolds autonomously to form a three-dimensional structure when the base card is transferred to an open state.

2. Prior Art Description

Three-dimensional pop-up cards, hereinafter also referred to as 3D cards, have been known for some time and come in a wide variety of designs. Such 3D cards essentially comprise a simply folded card as a base, hereinafter referred to as a base card, and a pop-up construct arranged in the base card. The main function of such a 3D card is that an initially essentially two-dimensional compressed figure rises three-dimensionally from the card plane when the folded card is opened.

Typically, 3D cards can be opened from a closed state by unfolding the base card by 180° into a flat plane. The underlying mechanism is based on the fact that the compressed figure is attached to the base card in such a way that opening the folded base card applies a tensile stress to the figure, which unfolds the figure from the compressed two-dimensional state to the three-dimensional or expanded shape.

Thus, the construction of 3D cards requires the formation of a figure that can be transformed from a compressed two-dimensional state to a three-dimensional state and also requires a means of fixing the figure inside the base card.

The task of the current invention is to provide a design that ensures easy fixation of the figure to the base card and easy unfolding of the figure when the 3D card is opened. This task is solved by providing a 3D pop-up card with a foldable base card which has an inner side and an outer side. The base card is foldable along a fold and is reversibly transferable from a folded, closed state to an unfolded, open state. A pop-up construct is fixed to the inner side of the base card wherein the pop-up construct unfolds automatically to form a three-dimensional structure when the base card is transferred to an open state. The base card has at least one position on each side of the fold, wherein the base card and the pop-up construct are connected to each other via hinge elements. Each hinge element has an anchor tab that engages the card and a specialized transition section that connects the anchor tab to the pop-up construct.

SUMMARY OF THE INVENTION

The present invention is a 3D pop-up card assembly where a pop-up construct extends from a base card when the base card is opened. The 3D pop-up card assembly includes a base card with a first panel and a second panel that are joined at a folding joint. A pop-up construct is mounted in the base card between the first panel and the second panel. The pop-up construct has pop-up panels that include a forward pop-up panel and a rearward pop-up panel. The pop-up panels can be moved between a folded flat condition and an unfolded three-dimensional condition. A first hinge element extends from the forward pop-up panel that connects the forward pop-up panel to the second panel of the base card. A second hinge element extends from the rearward pop-up panel that connects the rearward pop-up panel to the first panel of the base card.

The first hinge element and the second hinge element both have a transition section that leads to an anchor tab. The transition section contains a first fold line, a second fold line and a third fold line. None of the three lines are parallel. Each anchor tab is attached to the base card, therein connecting said forward pop-up panel and said rearward pop-up panel to the base card. When the base card is opened, each hinge element can rotate in unaligned planes, therein applying tension to the pop-up construct as the orientation between the base card and the pop-up construct changes.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention pop-up card system and methodology can be embodied in many ways, only one exemplary embodiment is illustrated and described. The exemplary embodiment is being shown for the purposes of explanation and description. The exemplary embodiment is selected in order to set forth one of the best modes contemplated for the invention. The illustrated embodiment, however, is merely exemplary and should not be considered as a limitation when interpreting the scope of the appended claims.

Figure 1:
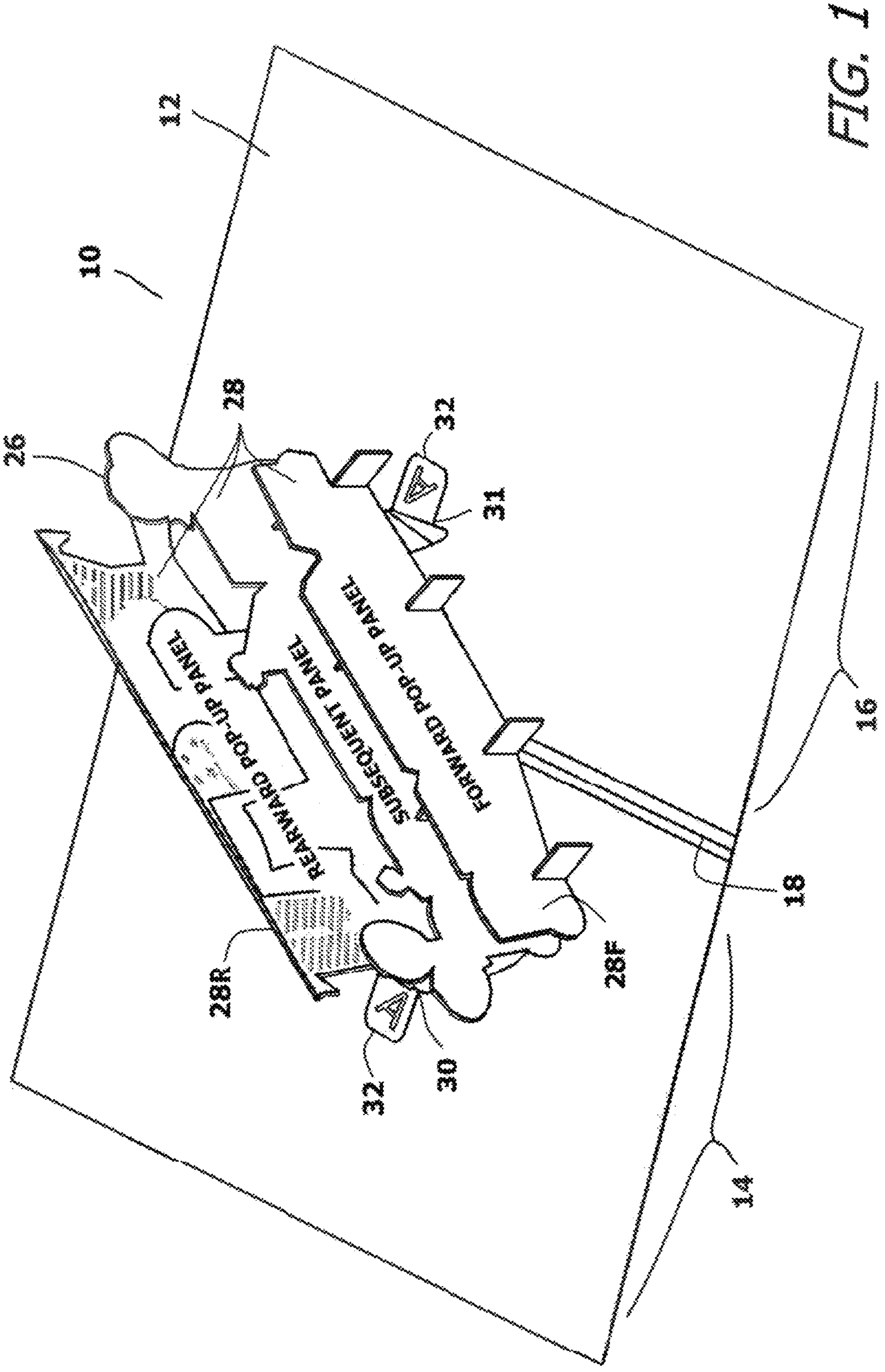
FIG. 1 shows an exemplary embodiment of a 3D pop-up card from an oblique top view.
Figure 2:
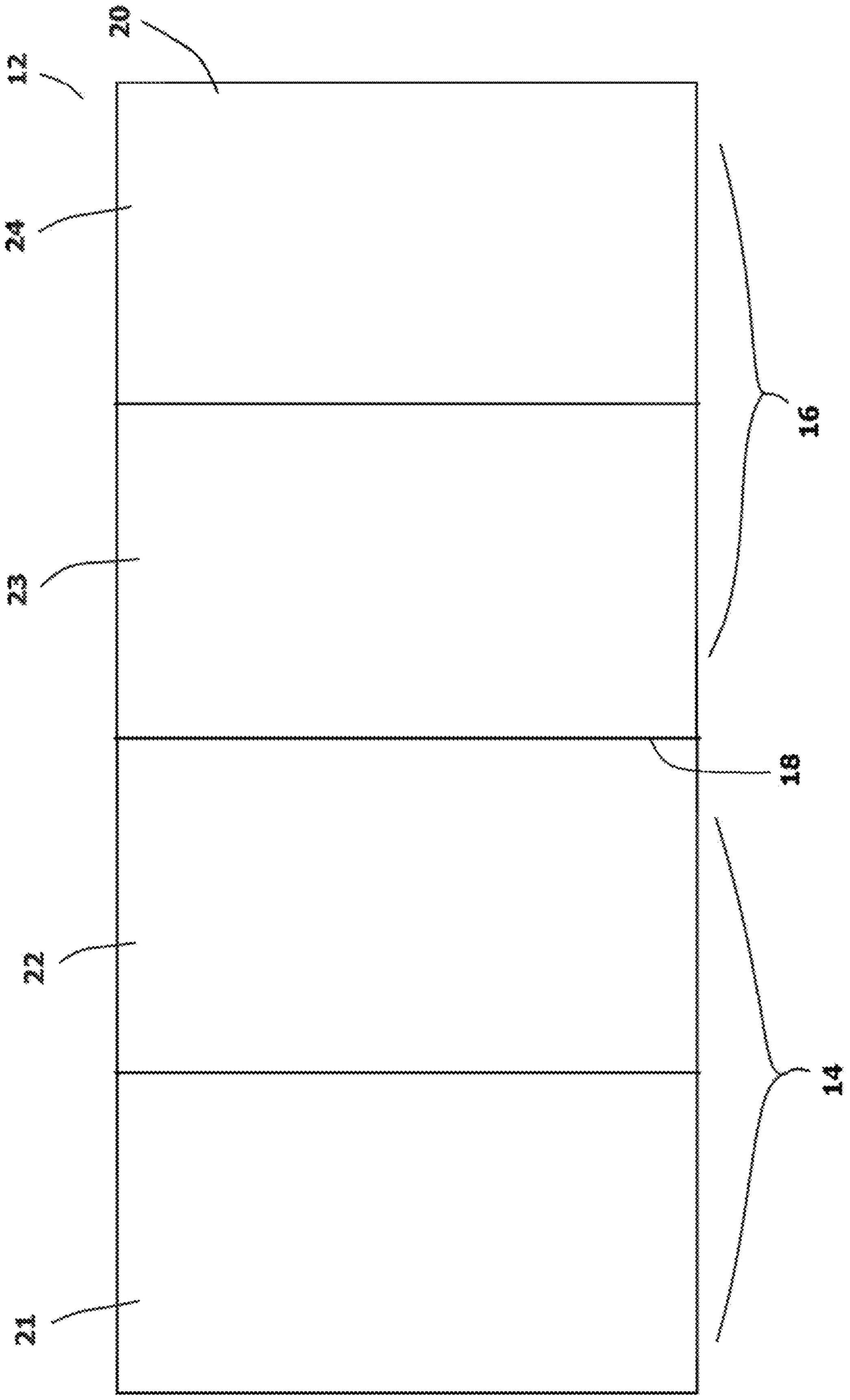
FIG. 2 shows the base card before folding.
Figure 3:
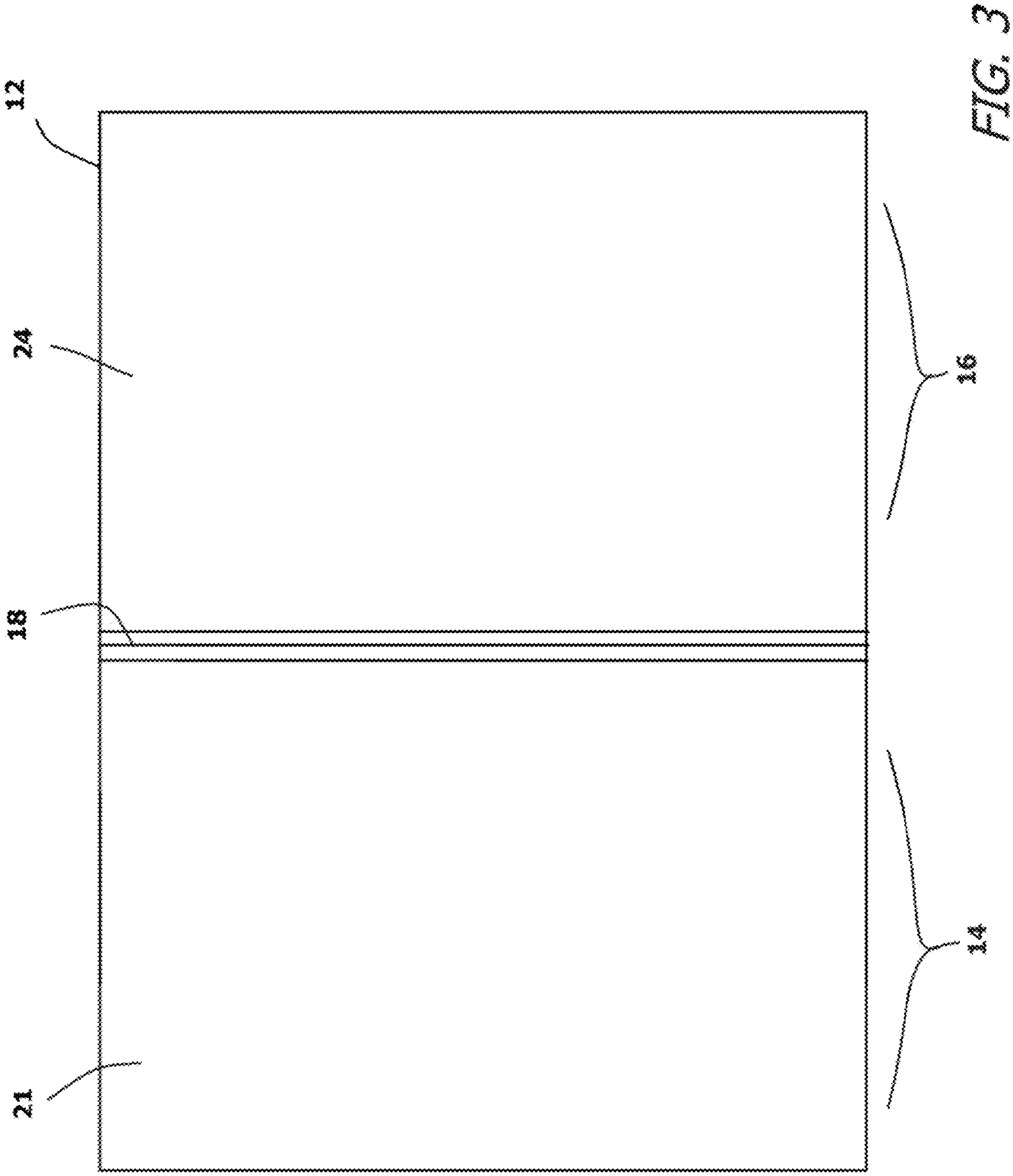
FIG. 3 shows the base card after folding.

Referring to FIG. 1 in conjunction with FIG. 2 and FIG. 3, a 3D pop-up card assembly 10 is shown. The pop-up card assembly 10 includes a base card 12. The base card 12 contains a first card panel 14 and a second card panel 16 that are joined by a common folding joint 18. The folding joint 18 enables the first card panel 14 to fold atop the second card panel 16 in a closed configuration so that the first card panel 14 and the second card panel 16 are both vertically aligned and parallel. In an open configuration, the first card panel 14 folds away from the second card panel 16 until the first card panel 14 and the second card panel 16 are coplanar.

The first card panel 14 of the base card 12 and the second card panel 16 of the base card 12 are both preferably made from a single piece of folded paper stock 20. The first card panel 14 and the second card panel 16 can be one layer or two layers thick. As is shown in FIG. 2 and FIG. 3, both the first card panel 14 and the second card panel 16 can be made two layers thick by segmenting the paper stock 20 into four segments 21, 22, 23, 24. The first segment 21 is folded over the second segment 22 to form the first card panel 14. The fourth segment 24 is folded over the third segment 23 to form the second card panel 16.

A pop-up construct 26 is provided that is attached to the base card 12 in at least two positions. The pop-up construct 26 is initially folded flat but forms a three-dimensional structure when placed in tension between specific points. Thousands of pop-up constructs have been designed for use in books and cards. Many of these known pop-up constructs can be adapted for use as part of the present invention.

In the illustrated embodiment, the pop-up construct 26 includes multiple pop-up panels 28. The pop-up panels 28 include a forward pop-up panel 28F and a rearward pop-up panel 28R. Other pop-up panels 28 can be included, depending upon the theme of the pop-up construct 26. The other pop-up panels 28 can be disposed behind, between and/or in front of the forward pop-up panel 28F and the rearward pop-up panel 28R. All of the pop-up panels 28, including the forward pop-up panel 28F and the rearward pop-up panel 28R are interconnected by lateral elements 29 (not shown). When the base card 12 is open, all the pop-up panels 28 are pulled upright and are extended into orientations that are generally perpendicular to the plane of the open base card 12.

The rearward pop-up panel 28R is attached to the first card panel 14 of the base card 12 at a first point 30. The forward pop-up panel 28F is attached to the second card panel 16 of the base card 12 at the second point 31. In order to make the pop-up construct 26 unfold into a three-dimensional structure, tension must be applied to the pop-up construct 26 between the points of attachment at the first point 30 and a second point 31. When the base card 12 is opened, the first card panel 14 rotates away from the second card panel 16, therein applying tension to the pop-up construct 26 anchored between the first point 30 and the second point 31. As a consequence, when the base card 12 is moved from its closed configuration to its open configuration, the pop-up construct 26 unfolds into a three-dimensional structure.

Figure 4:
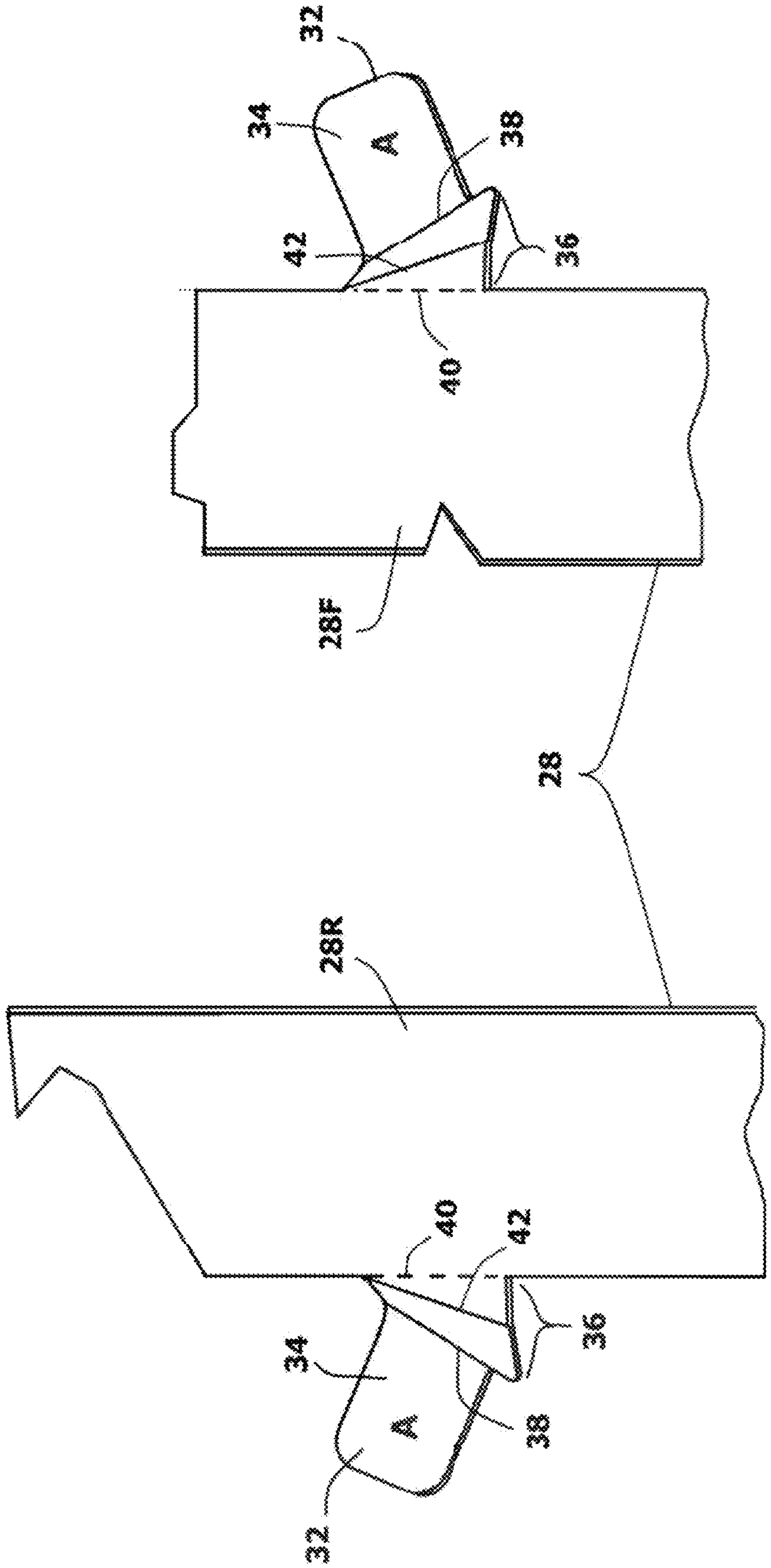
FIG. 4 shows the hinge elements used to connect the pop-up construct to the base card.
Figure 5:
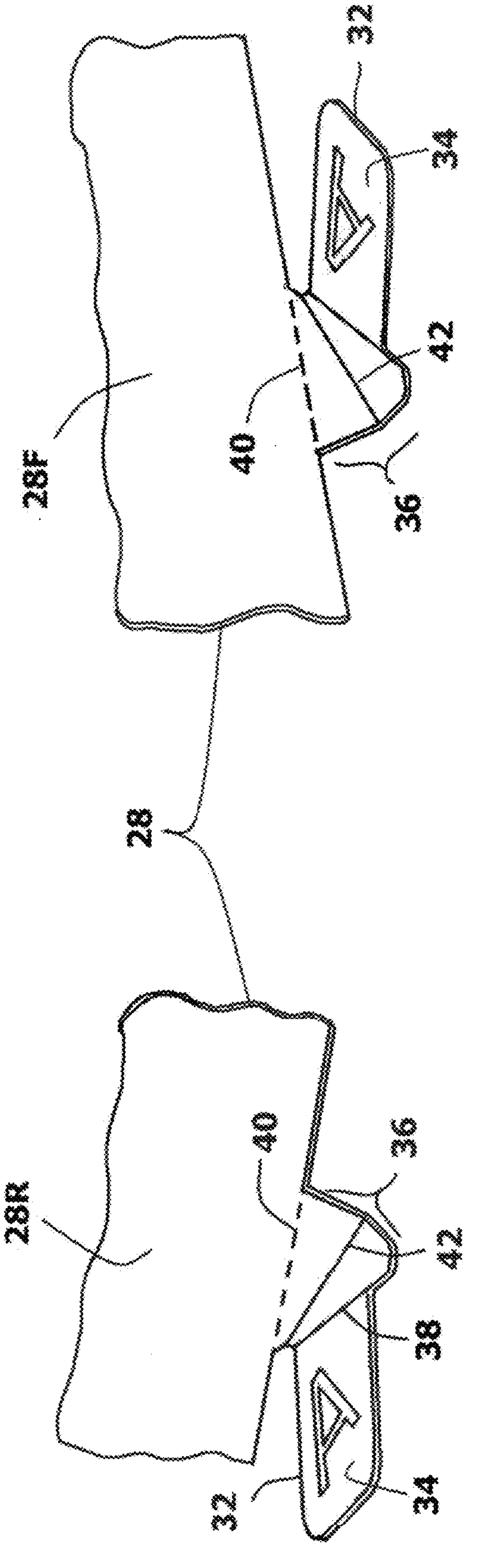
FIG. 5 shows the hinge elements of FIG. 4 at an alternate angle.

Referring to FIG. 4 and FIG. 5 in conjunction with FIG. 1, it can be seen that the forward pop-up panel 28F and the rearward pop-up panel 28R are both attached to the base card 12 using hinge elements 32. The hinge elements 32 are unistucturally formed as part of the pop-up panels 28 or can be separate elements that are affixed to the pop-up panels 28. Each hinge element 32 extends from a pop-up panel 28 and includes an anchor tab 34 and a transition section 36 that is disposed between the anchor tab 34 and the pop-up panel 28. The transition section 36 is generally triangular and contains a first long edge 38 and a second long edge 40 that diverge away from each other at an acute angle A1. The anchor tab 34 is generally rectangular and extends away from the first long edge 38 of the transition section 36, wherein the first long edge 38 forms one side of the anchor tab 34. The hinge element 32 is folded along the first long edge 38 and along the second long edge 40. In addition, there is a central fold 42 in the transition section 36 that bisects the transition section 36 between the first long edge 38 and the second long edge 40. The fold along the first long edge 38, the fold along the second long edge 40, and the central fold 42 all enable each hinge element 32 to repeatedly bend along the folds without tearing.

Figure 6:
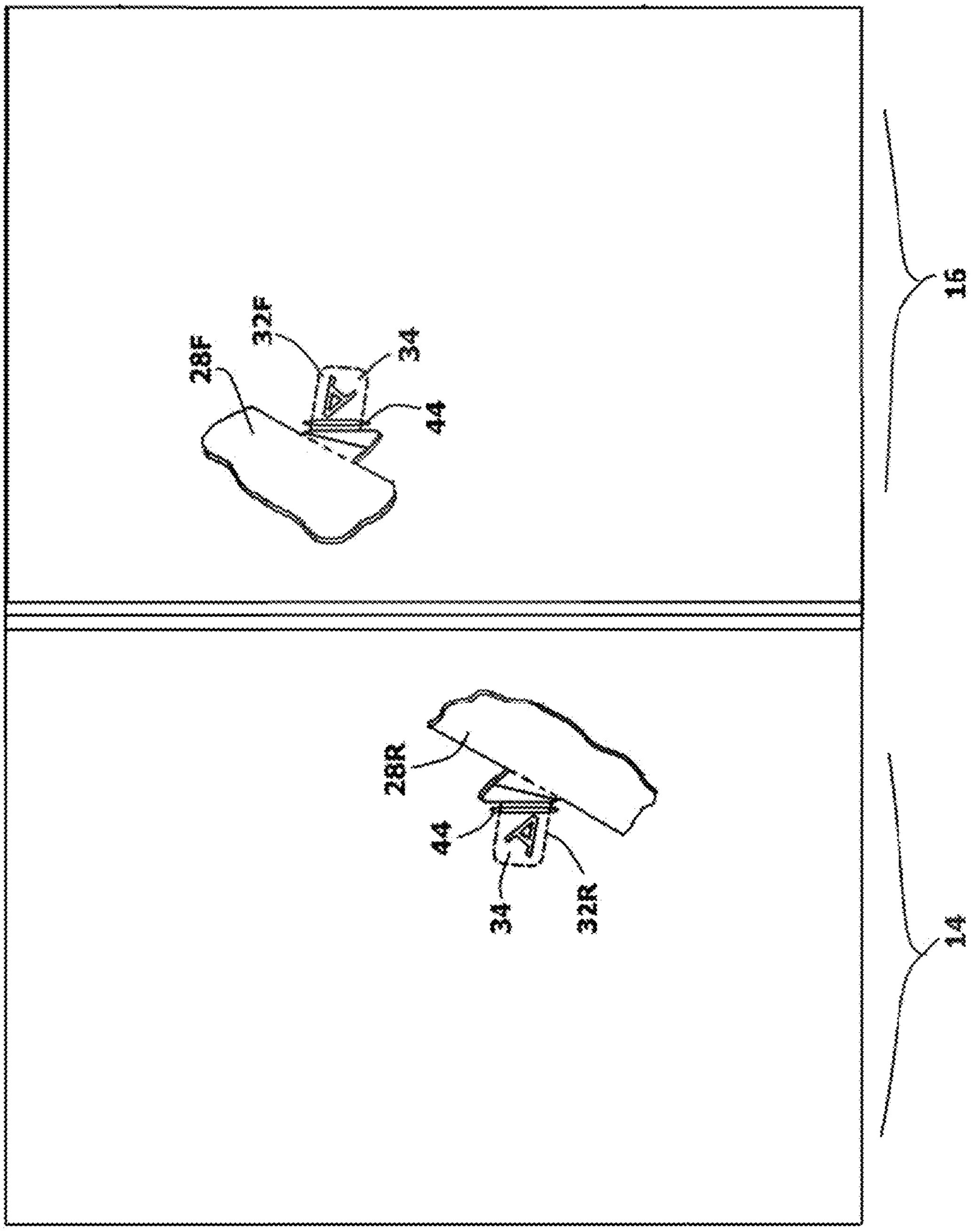
FIG. 6 shows segments of the base card with attached hinge elements after folding in combination.

Referring to FIG. 6 in conjunction with FIG. 4 and FIG. 1, it can be seen that at least two hinge elements 32F, 32R are used to attach the pop-up construct 26 to the base card 12. A first hinge element 32F attaches the forward pop-up panel 28F to the second card panel 16 of the base card 12 while a second hinge element 32R attaches the rearward pop-up panel 28R to the first card panel 14 of the base card 12.

The anchor tab 34 of each hinge element 32 is attached to the base card 12. Each anchor tab 34 can be glued or otherwise adhered to the base card 12. In the preferred embodiment, each anchor tab 34 is inserted into a slot 44 that is formed into the base card 12 and is adhered or otherwise anchored in place. In this manner, the anchor tab 34 of each hinge element 32 cannot be seen. However, if the anchor tab 34 is colored or otherwise contains graphics that match the interior of the base card 12, then each anchor tab 34 can be adhered directly to the base card 12 and will not detract from the overall aesthetics of the 3D pop-up card assembly 10.

The position of the pop-up construct 26 changes as the 3D pop-up card assembly 10 opens and closes. When the 3D pop-up card assembly 10 is fully open, and the pop-up construct 26 is fully deployed, the pop-up panels are perpendicular to the anchor tab 34 in one plane and angled to the first plane in a second plane. The offset causes forces to be applied to diagonally opposite portions of the pop-up construct 26 when unfolded. Accordingly, the pop-up construct 26 can be pulled apart diagonally and expanded.

The ability of the hinge elements 32 to fold at complex angles is provided by the three folds within the triangular transition section 36. The fold lines are not parallel and function as pleats to enable the pop-up panel 28 to both bend and turn away from the anchor tab 34 as the base card 12 is opened.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A 3D pop-up card assembly, comprising:

a base card having a first panel and a second panel joined at a common folding joint;

a pop-up construct having pop-up panels that can be moved between a folded flat condition and an unfolded three-dimensional condition; and hinge elements extending from at least two of said pop-up panels that connect said pop-up panels to said base card, wherein each of said hinge elements has an anchor tab and a transition section interposed between said anchor tab and said pop-up panel, and wherein said transition section contains a first fold line between said anchor tab and said transition section and a second fold line between said pop-up panel and said transition section, wherein said first fold line and said second fold line are not parallel; and wherein said anchor tab of each of said hinge elements is attached to said base card, therein connecting said pop-up construct to said base card.

2. The 3D pop-up card assembly according to claim 1, further including a third fold in said transition section disposed between said first fold and said second fold.

3. The 3D pop-up card assembly according to claim 1, wherein said transition section is triangular in shape.

4. The 3D pop-up card assembly according to claim 1, wherein each of said hinge elements unistucturally formed as part of said pop-up panels.

5. The 3D pop-up card assembly according to claim 1, wherein said pop-up panels include a forward pop-up panel attached to said second panel of said base card and a rearward pop-up panel attached to said first panel of said base card.

6. The 3D pop-up card assembly according to claim 5 wherein said hinge elements include a first hinge element that attaches said pop-up construct to said forward pop-up panel of said base card and a second hinge element that attaches said pop-up construct to said rearward pop-up panel of said base card.

7. The 3D pop-up card assembly according to claim 1, wherein said anchor tab and said pop-up panel on each of said hinge elements intersect said transition section at dissimilar angles.

8. A 3D pop-up card assembly, comprising:

a base card having a first panel and a second panel joined at a folding joint;

pop-up panels that include a forward pop-up panel and a rearward pop-up panel, wherein said pop-up panels can be moved between a folded flat condition and an unfolded three-dimensional condition; and a first hinge element extending from said forward pop-up panel that connects said forward pop-up panel to said second panel of said base card;

a second hinge element extending from said rearward pop-up panel that connects said rear pop-up panel to said first panel of said base card;

wherein said first hinge element and said second hinge element both have a transition section that leads to an anchor tab, and wherein said transition section contains a first fold line, a second fold line and a third fold line that are not parallel; and wherein each said anchor tab is attached to said base card, therein connecting said forward pop-up panel and said rearward pop-up panel to said base card.

9. The 3D pop-up card assembly according to claim 8, wherein said transition section is triangular in shape.

10. The 3D pop-up card assembly according to claim 8, wherein each of said first hinge elements is unistucturally formed as part of said forward pop-up panel.

11. The 3D pop-up card assembly according to claim 8, wherein each of said second hinge elements is unistucturally formed as part of said rearward pop-up panel.

* * * * *